Dec. 11, 1956   C. E. McCARTHY   2,773,340
HOSIERY PACKAGING
Filed Dec. 8, 1953

INVENTOR.
CHARLES E. McCARTHY
BY
Parrott & Richards
ATTORNEYS

United States Patent Office 2,773,340
Patented Dec. 11, 1956

2,773,340

HOSIERY PACKAGING

Charles E. McCarthy, Palisades Park, N. J., assignor to Chadbourn Hosiery Mills, Incorporated, a corporation of North Carolina Application December 8, 1953, Serial No. 396,836

2 Claims. (Cl. 53—21)

This invention relates to hoisery packaging of the type in which a pair of stockings is wrapped around a card and the length of the stockings indicated in some suitable manner, such as a printed scale, and the stockings and card packaged in an envelope or box in such a manner that the measured length of the stockings will be visible to the purchaser.

In accordance with the present invention, the length of the stockings is first accurately and reliably determined by a direct measurement of the length with a standard measuring unit, and the top of the stocking then attached to a card about which the pair of stockings is wrapped and in such a manner that the top of the stocking coincides with an associated visual inch scale printed on the card or other suitable place. This arrangement and procedure offers the advantages of a definite accurate measurement of the length of each pair of stockings, and a reliable fixed disposition of the stockings at the proper place with respect to an associated scale which indicates to the buyer the exact length of the stockings.

The procedure that particularly characterizes the present invention involves the steps of establishing on a table or other flat surface, a standard linear measure, with a 36 inch yardstick or the like, and providing on the flat surface a mark or the like corresponding to zero inches, and a stop spaced 36 inches from the mark. Any other suitable length scale, less or greater than 36 inches, may, of course, be used. The next step comprises placing a card, having an inch scale indicated thereon, against the stop, with the 36 inch line coinciding with the stop, and with the descending scale on the card extending toward the mark on the table. Next, a pair of stockings, the exact length of which is to be measured, is placed on the table so that the heel of the stocking coincides with the zero mark on the table, and the stocking then laid out in full length so that it extends over the above-mentioned card and the top of the stocking brought into alignment with the inch mark, or fraction of an inch, of the scale on the card, which will then indicate the exact length of the stocking.

When the stocking has been thus placed on the card, the operator then fixes this exact location by attaching the top of the stocking to the card by any suitable means, such as, for example, a small piece of masking tape, gum tape, "Scotch" tape, pin, staple, or slit in the card, etc. With the top of the stockings thus attached, the card is then lifted from the table and the stockings wrapped around the card with the necessary folding on the reverse side of the card to provide a neat package, whereupon, the card with the pair of stockings thus attached is ready to be inserted in an envelope or placed in a box, or otherwise packaged, as desired, and preferably with the top of the stocking easily visible to the purchaser so that the length of the stocking can be noted at a glance.

In a preferred but non-limiting embodiment of the invention, the above-described card on which the inch scale is recorded, and around which the pair of stockings is wrapped, is approximately 18 inches in length, that is, one half of the total measured distance on the above-mentioned table. With a card of this length, it can be folded crosswise along a center line of the card so that each face of the folded card would then be approximately 9 inches in length. The visible scale on the top face of the folded card would show the inch measurements from 27 inches to 36 inches, inclusive, which covers the usual range of lengths of ladies' hose. Also, this folded arrangement of the card will permit the doubled or folded portions of the stocking, including the foot portion, to be confined between the top and bottom faces of the folded card and thereby provide a neater package.

In accordance with the usual practice, the stockings will be measured and wrapped in pairs in carrying out the method of this invention, and it is to be understood that references hereinafter to "stocking" or "stockings" will indicate a pair of stockings.

Further and more detailed understanding of the invention will be had by reference to the accompanying drawings, in which.

Figure 1:
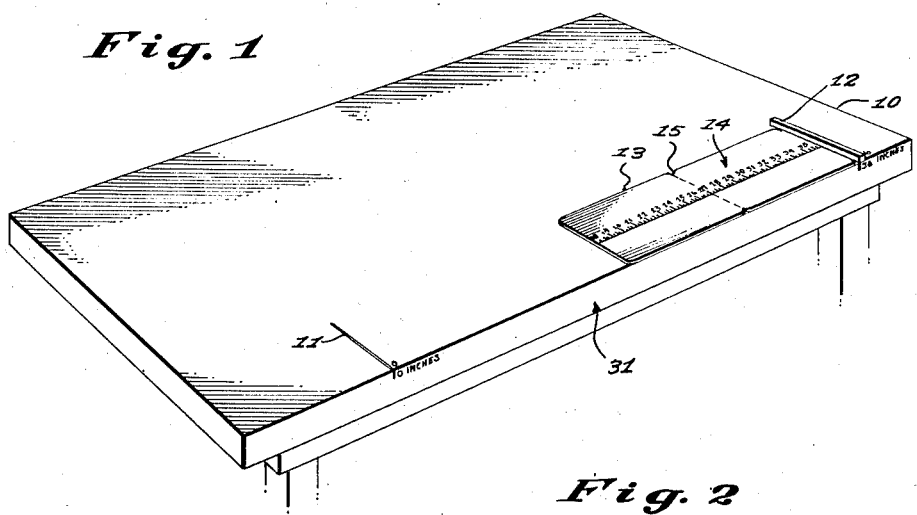
Fig. 1 is an elevational view of a flat working surface, in the form of a table, for measuring and wrapping of the stockings.

Referring now to the arrangement and procedures illustrated in the several figures in the drawing and generally in the order in which they occur, the working surface shown in Fig. 1 comprises a table 10 on the top of which is provided a starting point or zero inch mark 11 and a stop 12 located 36 inches away from the zero inch mark.

Lying flat and in unfolded position on the table top 10 is a paperboard or similar card 13 having an inch scale 14 printed or otherwise provided thereon. In this instance, the card 13 is 18 inches in length and the inch scale 14 extends from 18 inches to 36 inches. This card is also provided with a score line 15 substantially along the transverse center of the card whereby it may be easily folded to provide two 9 inch lengths.

Figure 2:
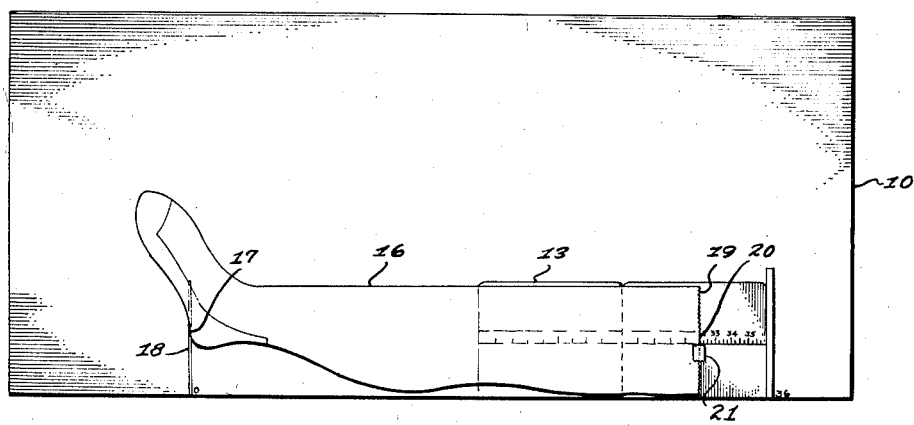
Fig. 2 is a plan view of the working surface showing a stocking laid out flat for measuring its exact length.

With the arrangement illustrated in Fig. 1, above described, the length of a pair of stockings can be easily and accurately determined as indicated in Fig. 2. As shown therein, the pair of stockings 16 is laid out flat on the table top 10 and the heel of the stocking 17 is placed on the zero inch line 18, whereupon the pair of stockings is then extended to full length, with the upper portion of the stockings covering a portion of the length of the card 13 and the top of the stockings 19 coinciding with a certain inch mark 20. This inch mark, which in the particular case shown in Fig. 2 is the 32 inch mark, then indicates the accurate measured length of the pair of stockings 16. When this operation has been performed, the operator will then affix the pair of stockings 16 to the card 13 by attaching partly to the upper edge of the stockings 19 and partly to the adjacent portion of the card 13 a small piece of tape shown at 21. This completes the measuring of the stocking and the next operation comprises folding of the measured stockings around the card, as indicated in Fig. 3.

Figure 3:
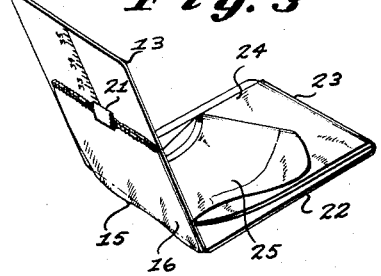
Fig. 3 is a side elevational view of the card inserted around which the pair of stockings is wrapped and the foot portion folded between the upper and lower faces of the folded card insert.

Referring to Fig. 3, it will be noted that the pair of stockings 16 fastened at the upper end to the card insert 13 by means of the tape 21 extends around the remaining length of this face of the card as indicated at 22, and are folded back around the other end of the card as indicated at 23 and are then laid upon the inner face of the card as shown at 24 with the foot of the stocking 25 neatly folded back on the leg of the stocking beneath. When the stocking folding operation has thus been completed, the two faces of the card 13 are then brought together by folding the card along the hinge or score line 15, to form a neat flat package adapted for any desired additional form of packaging as indicated in Figs. 4 and 5.

Figure 4:
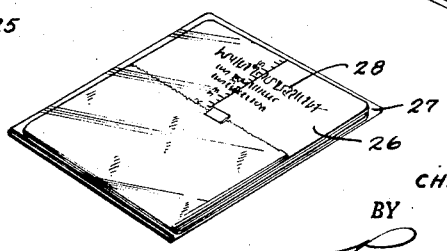
Fig. 4 is an elevational view of the measured stockings folded around the card insert and the stockings and card inserted in a transparent envelope; and, Fig. 5 is an elevational view of a box in which the measured stockings and card insert are placed for packaging.

Referring to Fig. 4, the folded pair of stockings and card insert indicated generally at 26 is included in a transparent cellophane or the like package 27 on which any desired advertisement or other indicia may be printed as indicated at 28. It will be noted in Fig. 4 that the measured length of the stocking is easily visible through the transparent bag 27.

Figure 5:
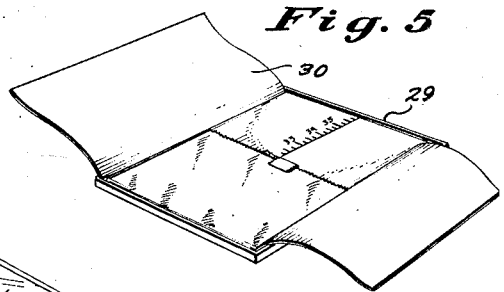

In Fig. 5, an alternative form of packaging of the measured pair of stockings and card insert is illustrated. In this instance, a cardboard or the like box 29 is used instead of a transparent envelope and the box may contain a folded sheet of tissue paper or the like 30, for covering the stockings but adapted to be folded back to display the stockings and indicate the measured length thereof.

Variations of the arrangements and procedures described hereinabove are contemplated in the spirit and scope of my invention and illustrative but non-limiting examples of which are as follows:

(a) In the arrangement shown in Fig. 1 of the drawing, a yardstick or similar rule might be attached along the side of the table 31 or recessed in the flat-topped surface of the table, as a substitute for the zero inch line and stop located 36 inches apart;

(b) Instead of printing the inch scale 14 on the card insert 13, this scale might be printed on the transparent bag 27 shown in Fig. 4 and in such a location that the previously measured length of the stockings by the operation described in connection with Figs. 1 and 2 above, would correspond with the proper inch mark on the scale printed on the transparent envelope 27;

(c) In lieu of a completely transparent bag such as 27 shown in Fig. 4, an opaque bag or envelope or the like might be used provided a transparent window portion thereof would be included in one face of the bag so that the measured length of the stocking would appear through this window.

Various other modifications and changes may be made in the arrangements and procedures described hereinabove without departing from the scope of my invention as defined in the appended claims.

I claim:

1. A method of packaging hosiery comprising the steps of providing a fixed reference point and a locating means spaced therefrom at a maximum hosiery length, positioning a packaging card to extend from said locating means toward said reference point in a length sufficient to include standard length variations below said maximum length, placing the foot portion of a pair of hose at said reference point and extending said hose therefrom to dispose the top portion thereof in overlying relation at one face of said card, attaching the extended top portion of said hose to said card at the overlying position thereof, folding the extending lower portion of said hose at the opposite face of said card and enclosing the folded hose and card in a package with indicia arranged in relation to the length of said card for indicating the length of said hose from the attached overlying position thereof.

2. A method of packaging hosiery as defined in claim 1 and further characterized in that said indicia is recorded on the face of said card to which said hose is attached.

References Cited in the file of this patent

UNITED STATES PATENTS

| 2,230,559 | Cartier | Feb. 4, 1941 |
| 2,521,529 | Mauney | Sept. 5, 1950 |
| 2,537,417 | Merske | Jan. 9, 1951 |
| 2,573,827 | Bigelow | Nov. 6, 1951 |
| 2,622,730 | Sharp | Dec. 23, 1952 |

FOREIGN PATENTS

| 662,144 | Germany | July 6, 1938 |
| 665,689 | Germany | Oct. 1, 1938 |